UNITED STATES PATENT OFFICE.

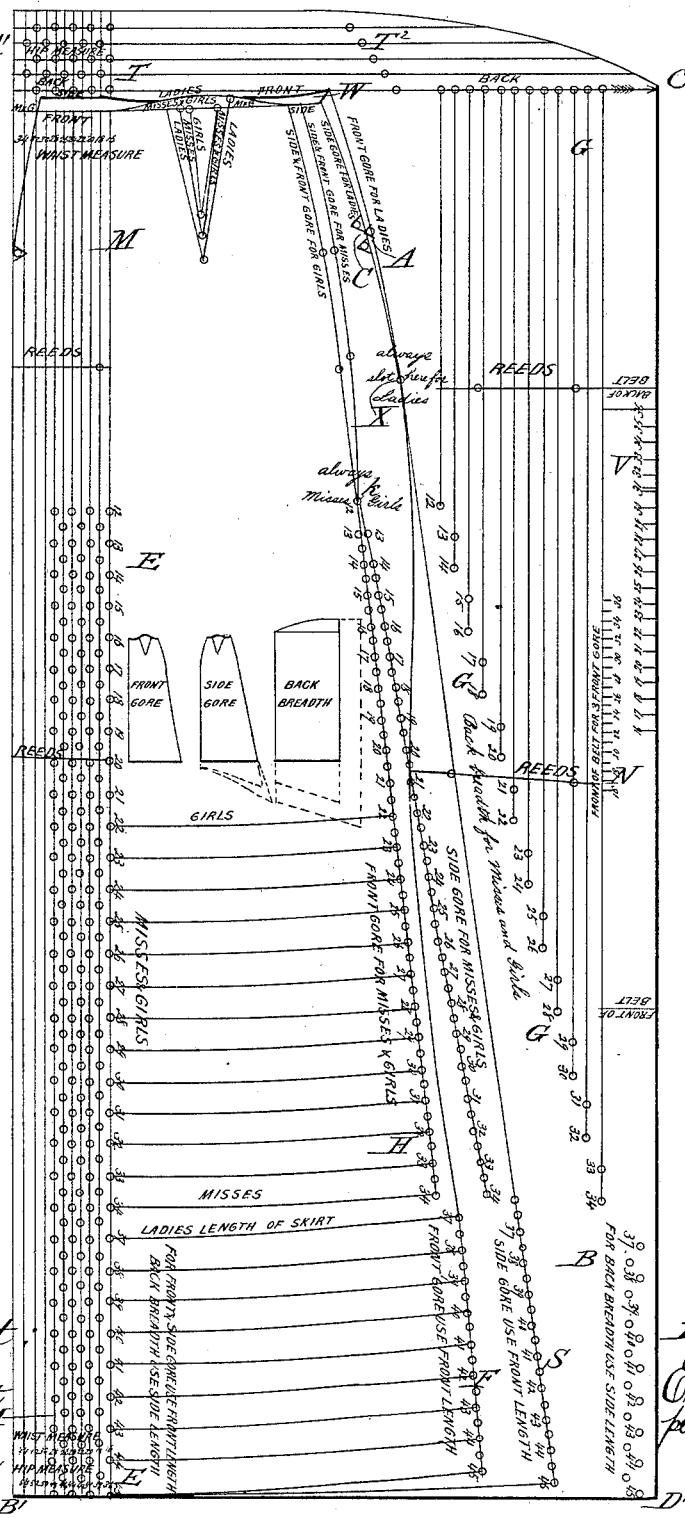

EMMA M. HUOT, OF LEWISTON, MAINE.

DRESS-SKIRT CHART.

SPECIFICATION forming part of Letters Patent No. 433,203, dated July 29, 1890.

Application filed March 22, 1890. Serial No. 344,976. (No model.)

*To all whom it may concern:*

Be it known that I, EMMA M. HUOT, a citizen of the United States, residing at Lewiston, in the county of Androscoggin and State of Maine, have invented certain new and useful Improvements in Dress-Skirt Charts; and I do hereby declare the following to be a full, clear, and exact description of the invention, such as will enable others skilled in the art to which it appertains to make and use the same.

This invention relates to a new and improved device or chart for measuring and drafting skirts for ladies, misses, and girls, whereby a more perfect fitting and a better hanging garment may be made and a great saving of time, labor, and goods effected. In using this chart, in order to successfully accomplish its purpose it becomes necessary that a belt or cord be placed around the body by which a positive point is secured from which most of the important measurements may be taken.

The invention therefore consists, essentially, in the chart for dressmaking, and in certain details and peculiarities in the construction and formation thereof, substantially as will be hereinafter described and claimed.

The accompanying figure of drawing illustrates my chart in plan view.

Similar letters and figures of reference designate corresponding parts in the drawing.

In taking measurements for cutting skirts it is necessary to take a particular point in each case from which all measurements relating to length may be made. This point, for the most perfect drafting of the garment, should be found by arranging a belt or cord around the waist and allowing it to slant in the same direction as the belt of the skirt would naturally slant. In the drawing the complete chart is shown printed in one piece. By referring thereto we will see that said chart is provided with a scale relating to length and width and also to the length of the belt and the portion thereof into which the front and side gores of the skirt should be sewed.

I will now proceed to a more minute description of the chart.

A′ B′ represent one edge of the chart when it is in the position shown. Parallel to this line is a series of lines—ten in number, or eleven including the edge line—located a third of an inch apart and constituting the scale M. The lines of this scale are marked from 16 to 34, so that the scale may be used to control the width when taken from waist-measure. It is also marked from 36 to 54 for the hip-measure. Said marks for the waist-measure and hip-measure are located near the left-hand end of the scale and also near the right-hand end.

On the inner line of the series of scale M is marked a series of divisions E, running from 12 to 34, for misses and girls, to be used in regulating or measuring the length, each division of this series being one inch. The scale E controls the length of the center of back breadth for ladies, misses, and girls. This scale, after the point 34 is passed, runs from 37 to 45. This scale E is arranged so that when front measures to the floor call for forty inches the chart will be marked forty inches, but will really measure only thirty-eight inches. If the sides call for forty inches, same as front, in practical use the practice is to dot at forty inches, but the chart will be only thirty-eight and one-half inches in measurement. If the back calls for forty inches, the chart measures thirty-nine inches in the back, although it is marked forty inches. The measurement of girls will be on a different scale.

Scale F runs from 37 to 45, the divisions being one inch apart and the points thereof being connected with the points from 37 to 45 on scale E by connecting-lines, as shown. This scale F controls the length of the gored edge of the front gore for ladies. Scale H controls the length of the same edge of the front gore for misses and girls. Its divisions run from 12 to 34, said divisions being one inch apart and the points thereof being connected with the correspondingly-numbered points on the scale E by straight lines, as shown. Thus it will be seen that the scale F is substantially parallel or slightly inclined to a portion of the scale E, while the scale H is slightly inclined to the remaining portion of the scale E.

Adjacent to the scale H is the scale I, inclined to said scale H and meeting it at one end, while at the other end the two scales are separated to a greater or less extent, as shown on the chart. Scale I controls the length of the gored edge of the side gore for misses and girls. It runs from 12 to 34, the same as the scale H, and its numbered divisions are one inch apart.

Adjacent to the scale F, and running in substantially the same direction, is the scale S. This controls the length of the gored edge of the side gore for ladies. Its divisions are marked from 37 to 45, the same as the divisions of the scale F. On all these scales H F I S, &c., semi-divisions or other points may be marked, as desired, so as to make the measurements more accurate. In the corner of the chart and parallel to the edge thereof and near the scale S is the scale B, its divisions being marked from 37 to 45 and being one inch apart. This scale B controls the length of the edge of the back breadth, which is sewed to the side gore for ladies. We have already seen that scale E controls the length of the center of the back breadth. Scale B therefore controls the length of the back-breadth edge, which is sewed to side gore.

We now refer to scale G, located between the scale I and the edge of the chart. This scale is used to control the width and length both of the back breadth for misses and girls. This scale consists of a dozen parallel lines upon equal length. It is marked from 12 to 34, each division being one-half inch for width. See the left-hand end of the series of parallel lines constituting the scale G. For length it is marked likewise from 12 to 34, each division being an inch.

C' D' is the edge of the chart parallel to A' B'. On this outer edge is marked the scale V, running from 16 to 36 inches, each division being one-half inch. This scale controls the side of the belt. On the line of scale G nearest to scale V and adjacent to said scale, is marked the scale N, which controls that portion of the belt into which the front and side gores are to be sewed. It is marked with divisions running from 16 to 36, each division being one-third inch. At the end of the chart, where the outer line A' C' is located, said end being in the location of the chart, as shown in Fig. 1, at the left-hand end thereof, but commonly being at the top of the chart when it is in the position which it occupies in actual use, is a scale T, used to make allowance for the bustle when worn, said scale running from 0 to 2½, as it will be observed it is marked thereon, each division being one-half inch. Furthermore, it will be seen on this scale that the scale T² is marked.

Having thus described my invention, what I claim as new, and desire to secure by Letters Patent, is—

1. The herein-described chart for use in dressmaking, having the scale M for the waist and hip measures, consisting of ten lines parallel to one edge of the chart, the scale E for measuring the length of the center of back breadth, said scale being marked on the inner line of the series of scale M, the scale F for controlling the length of the gored edge of the front gore of ladies' dresses, said scale being inclined to a portion of the scale E, and having its divisions connected with the divisions of said scale E by connecting-lines, as shown, and the scale H for controlling the length of the gored edge of the front gore for misses' and girls' dresses, said scale being parallel or slightly inclined to the remaining portion of the scale E, and having its divisions connected by straight lines with corresponding divisions on the scale E, all substantially as described.

2. The herein-described chart for use in dressmaking, having the scale M for the waist and hip measures, consisting of ten lines parallel to one edge of the chart, the scale E for measuring the length of the center of back breadth, said scale being marked on the inner line of the series of scale M, the scale F for controlling the length of the gored edge of the front gore of ladies' dresses, said scale being inclined to a portion of the scale E, and having its divisions connected with the divisions of said scale E by connecting-lines, as shown, and the scale H for controlling the length of the gored edge of the front gore for misses' and girls' dresses, said scale being parallel or slightly inclined to the remaining portion of the scale E, and having its divisions connected by straight lines with corresponding divisions on the scale E, and the scale I, adjacent to the scale H and inclined thereto, meeting at one end, while at the other end the two scales are separated, said scale I controlling the length of the gored edge of the side gore for misses' and girls' dresses, the scale S, adjacent to the scale F and running in substantially the same direction, for measuring the length of the gored edge of the side gore for ladies, the scale B in the corner of the chart, parallel to the edge thereof and adjoining the scale S, for measuring the length of the edge of the back breadth for the side gore for ladies, all substantially as described.

3. The herein-described chart for use in dressmaking, having the scale M for the waist and hip measures, consisting of ten lines parallel to one edge of the chart, the scale E for measuring the length of the center of back breadth, said scale being marked on the inner line of the series of scale M, the scale F for controlling the length of the gored edge of the front gore of ladies' dresses, said scale being inclined to a portion of the scale E, and having its divisions connected with the divisions of said scale E by connecting-lines, as shown, and the scale H for controlling the length of the gored edge of the front gore for misses' and girls' dresses, said scale being parallel or slightly inclined to the remaining portion of the scale E, and having its divisions connected by straight lines with corresponding divisions on the scale E, and the scale I, adjacent to the scale H and inclined thereto, meeting at one end, while at the other end the two scales are separated, said scale I controlling the length of the gored edge of the side gore for misses' and girls' dresses, the scale S, adjacent to the scale F and running in substantially the same direction, for measuring the length of the gored edge of the side gore for ladies, the scale B in the corner of the chart, parallel to the edge thereof and adjoining the scale S, for measuring the length of the edge of the back breadth for the side gore for ladies, the scale G, located between the scale I and the edge of the chart, for measuring the width and length of the back breadth for misses' and girls' dresses, said scale consisting of a dozen parallel lines of unequal length, and the scale V, marked on the outer edge of the chart, together with the scale N, for controlling that portion of the belt into which the front and side gores are to be sewed, said scale N being marked on that line of scale G nearest the scale V, substantially as described.

4. The herein-described chart for use in dressmaking having the scale M consisting of ten lines parallel to one edge of the chart, said scale being used for the waist and hip measures, the scale E marked on the inner line of the series of scale M, said scale E being for measuring the length of the center of the back breadth, the scale F inclined to the scale M for controlling the length of the gored edge of the front gore for ladies' dresses, and scale H, likewise inclined to the scale E, for controlling the length of the same edge of the front gore for misses' and girls' dresses, the scales I and S, adjacent to and slightly inclined to scales H and F, respectively, the back-breadth scale B and the back-breadth scale G, which consists of a dozen parallel lines of unequal length, together with the slots marked on the chart, the dart marks, points A and C, and the point X.

In testimony whereof I affix my signature in presence of two witnesses.

EMMA M. HUOT.

Witnesses:
LEVI GREENLEAF,
L. H. BUCKNAM.